United States Patent [19]

Akao

[11] Patent Number: 4,629,640
[45] Date of Patent: Dec. 16, 1986

[54] PACKAGING MATERIALS FOR PHOTOSENSITIVE MATERIALS

[75] Inventor: Mutsuo Akao, Minami-ashigara, Japan

[73] Assignee: Fuji Photo Film Co., Ltd., Kanagawa, Japan

[21] Appl. No.: 691,634

[22] Filed: Jan. 15, 1985

[30] Foreign Application Priority Data

Jan. 19, 1984 [JP] Japan ................................ 59-6250

[51] Int. Cl.$^4$ ..................... B32B 15/08; B32B 27/06; C09J 7/02
[52] U.S. Cl. ..................... 428/35; 428/216; 428/349; 428/354; 428/461; 428/463; 428/515; 428/516
[58] Field of Search ............. 428/461, 457, 463, 349, 428/354, 515, 516, 35, 216, 215

[56] References Cited

U.S. PATENT DOCUMENTS 4,452,846  6/1984  Akao ............................. 428/461 X Primary Examiner—Thomas J. Herbert
Attorney, Agent, or Firm—Burns, Doane, Swecker & Mathis

[57] ABSTRACT

A packaging material for photosensitive materials comprising an at least double-layer laminated film formed by laminating a light-shielding layer and a metallizing film wherein:
(a) said metallizing film comprising a flexible sheet having a thickness of 5 to 120 microns and a thin metal layer having a thickness of 55 to 1200 angstroms,
(b) said light-shielding layer comprises a polyethylenic polymer and 0.3% by weight or more of a light-shielding material, said polyethylenic polymer containing 45% by weight or more of a low-pressure linear low-density polyethylene (L-LDPE), and
(c) said laminated film has a moisture permeability of 15 g/m$^2$/24 hours or less (at 40° C. and 90% RH).

The light-shielding layer is laminated directly or indirectly onto said metallizing film not through or through an adhesive layer.

The light-shielding layer may form a heat-seal layer, or a heat-seal layer may be applied.

17 Claims, 12 Drawing Figures

PACKAGING MATERIALS FOR PHOTOSENSITIVE MATERIALS

FIELD OF THE INVENTION

The present invention relates to an antistatic packaging material for photosensitive materials for photographic purposes in particular, which is improved in respect of physical strength, flexibility, cost, light-shielding properties and moistureproofness.

BACKGROUND OF THE INVENTION

As the packaging materials for photosensitive materials there have been available laminates wherein two layers, a flexible sheet layer and a carbon black-containing polyethylene film layer are laminated on both sides of an aluminum foil. The reason for using the aluminum foil is to eliminate the disadvantages that the thermoplastic resin film is poor in moistureproofness, likely to be electrostatically charged by peeling-off, etc. The result is, on the contrary, that tear strength, resistance to impact perforation and Gelbo test strength deteriorate considerably, as compared with the sole use of thermoplastic resin films and, in particular, a breakage problem arises in the packaging of heavy articles. The aluminum foil-incorporated films (as disclosed in U.S. Pat. No. 4,452,846 corresponding to Japanese Patent Kobai Pulication No. 58-132555) increase in the overall thickness due to the necessity of providing adhesive layers on both sides of the aluminum foil, thus leading to not only a loss of flexibility but also to a rise in the production cost.

SUMMARY OF THE DISCLOSURE

A primary object of the present invention is therefore to solve these problems. It is an object of the present invention to provide an improved novel packaging material.

It is another object of the present invention to provide a packaging material which is relatively inexpensive, has moistureproofness as well as antistatic and light-shielding properties comparable to those of the prior art aluminum foil-incorporated packaging materials, and excels in physical strength.

Basically, the present invention provides a packaging material obtained by laminating a flexible sheet layer, on which a thin metal layer is being formed, with a light-shielding layer comprised of 0.3% by weight or more of a light-shielding material and a polyethylene polymer containing 45% by weight or more of a low-pressure-processed, linear low-density polyethylene (hereinafter called "low-pressure linear low-density polyethylene" or "L-LDPE"), instead of laminating together an aluminum foil-incorporated flexible sheet and a carbon black-containing polyethylene film.

Marked improvements are introduced in tear strength, flexibility, resistance to impact perforation, heat sealability, slip properties, Gelbo test strength and moistureproofness by the use of a flexible sheet layer on which a metal thin film is formed and an L-LDPE-containing polyethylenic polymer to which a light-shielding material is added.

More specifically, the packaging material for photosensitive materials according to the present invention comprises an at least double-layer laminated film formed by laminating a light-shielding layer and a flexible sheet layer including a thin metal layer formed thereon, which is characterized in that:

(a) in said flexible sheet layer the flexible sheet has a thickness of 5 to 120 microns with the thin metal layer having a thickness of 55 to 1200 angstroms, (b) said light-shielding layer comprises of a polyethylenic polymer and 0.3% by weight or more of a light-shielding material, said polyethylenic polymer containing 45% by weight or more of a low-pressure linear low-density polyethylene (L-LDPE), and (c) said laminated film has a moisture permeability of 15 $g/m^2/24$ hours or less (at 40° C. and 90% RH).

BRIEF DESCRIPTION OF THE DRAWINGS

The foregoing and other objects and features of the present invention will become apparent from the following detailed description with reference to the accompanying drawings, which are given for the purpose of illustration alone, and in which.

In the Drawings the encircled reference numerals represent that it contains the light-shielding material therein.

DETAILED DESCRIPTION OF THE PREFERRED EMBODIMENTS OF THE INVENTION

Figure 1:
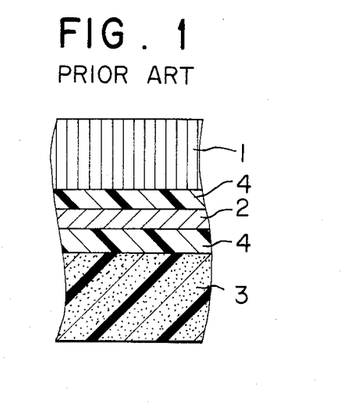
FIG. 1 is a sectional view of a typical prior art packaging material for photosensitive materials, FIGS. 2 to 6 inclusive are sectional views of the packaging materials for photosensitive materials according to the present invention.
Figure 2:
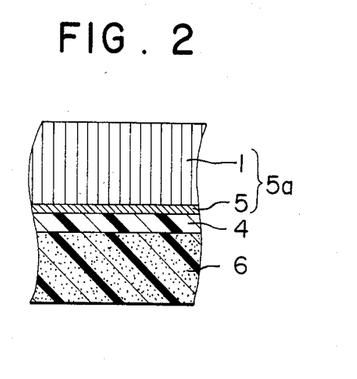

FIG. 1 is a sectional view of one typical example of the prior art packaging materials for photosensitive materials. FIGS. 2 to 6 typically show the packaging materials of the present invention. In the packaging material of FIG. 2, a metallizing film 5a includes a flexible sheet 1 with a thin metal layer 5 formed on it, and is laminated thereon with a light-shielding layer ⑥ through an adhesive layer 4, said layer ⑥ substantially comprising a low-pressure linear low-density polyethylene (L-LDPE) and further containing at least 0.3% by weight of a light-shielding material. In the packaging material of FIG. 3, a protective layer 7 is added to the flexible sheet 5a of FIG. 2 to form a complex flexible sheet layer 5a', which is in turn laminated thereon with a light-shielding layer ⑥ through an adhesive layer 4, said layer ⑥ being a layer comprising susbstantially a low-pressure linear low-density polyethylene (L-LDPE) and further containing at least 0.3% by weight of a light-shielding substance. In the packaging material of FIG. 4, a heat sealing layer 8 having a melting point lower than that of the light-shielding layer ⑥ of FIG. 2 is laminated directly onto that layer ⑥ for the purpose of improving bag-making properties and preventing the photosensitive materials from contamination or by the light-shielding material or adverse influence upon the photosensitive materials.

Figure 5:
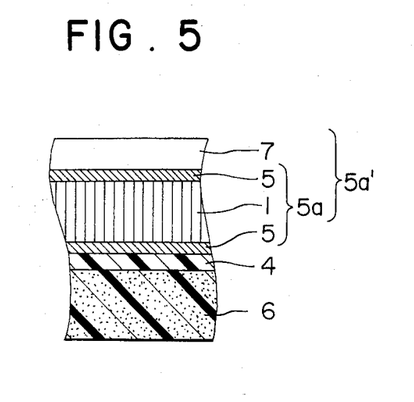

FIG. 5 shows a modified packaging material of FIG. 2, wherein the flexible sheet 1 is provided on both its sides with thin metal layers 5, the outer one of which is additionally provided with a protective layer 7 so as to protect it and, if required, improve slip properties and afford heat sealability to a double-sheet bag upon making this, thereby forming another complex flexible sheet layer 5a' which is in turn laminated thereon with the light-shielding layer ⑥ through the adhesive layer 4.

Figure 6:
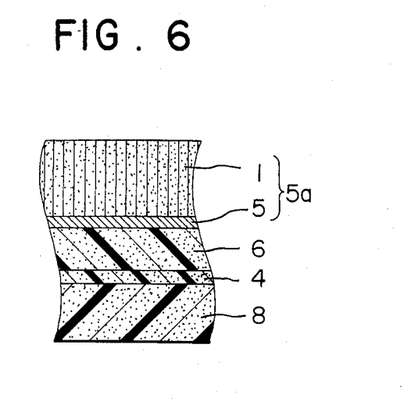

The packaging material of FIG. 6 has all its layers exhibiting light-shielding properties to introduce considerable improvements in light-shielding and antistatic properties. When using as the light-shielding materials carbon black, powdery metals, aluminum paste, metal or carbon fibers, etc., not only the light-shielding properties but also the antistatic properties are further improved.

Referring briefly to the preparation of the packaging material according to this embodiment, the light-shielding L-LDPE layer ⑥ is laminated directly onto the metallizing film 5a including the light-shielding material-containing flexible sheet layer ① with the thin metal layer 5 formed thereon, which is in turn thereon laminated through the light-shielding material-containing adhesive layer ④ with a light-shielding material-containing heat seal layer ⑧.

Figure 7:
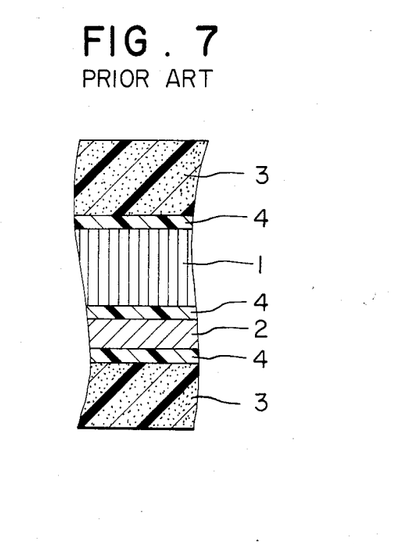
FIG. 7 is a sectional view of the conventional, costly seven-layer packaging material for photosensitive materials, which has so far been used as the packaging materials for heavy articles.

In the packaging material of FIG. 7, a light-shielding low-pressure low-density polyethylene layer containing carbon black is laminated onto the outside of the structure of FIG. 1 through the adhesive layer 4.

Figure 8:
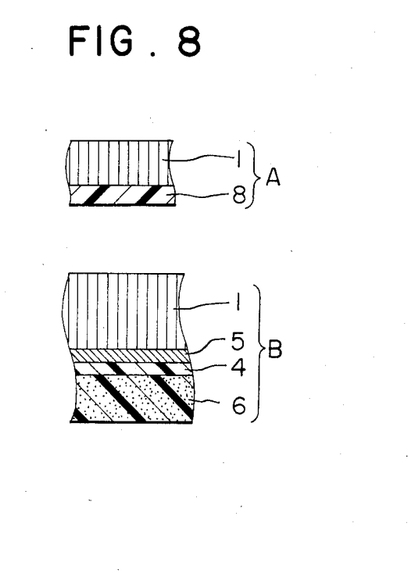
FIG. 8 is a sectional view of a typical double-sheet bag product for photosensitive materials, in which an outer sheet A is used together with an inner sheet B formed of the invented packaging material of the layer structure of FIG. 2.

In a typical example of the double-sheet bag product for photosensitive materials, as shown in the sectional view of FIG. 8, an outside sheet A is combined with an inside sheet B formed of the inventive packaging material, the layer structure of the inside sheet B being illustrated in FIG. 2.

Figure 9:
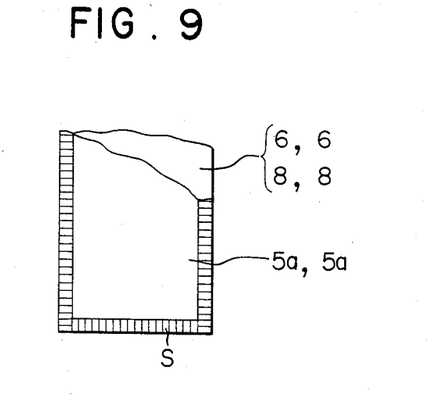
FIG. 9 is a partly cut-away perspective view of the flat bag formed of the invented packaging material.

FIG. 9 is a partly cut-out sectional view of a flat bag making use of the packaging material according to the present invention, wherein the reference capital S stands for a sealed region by heat-sealing or adhesives.

Figure 10:
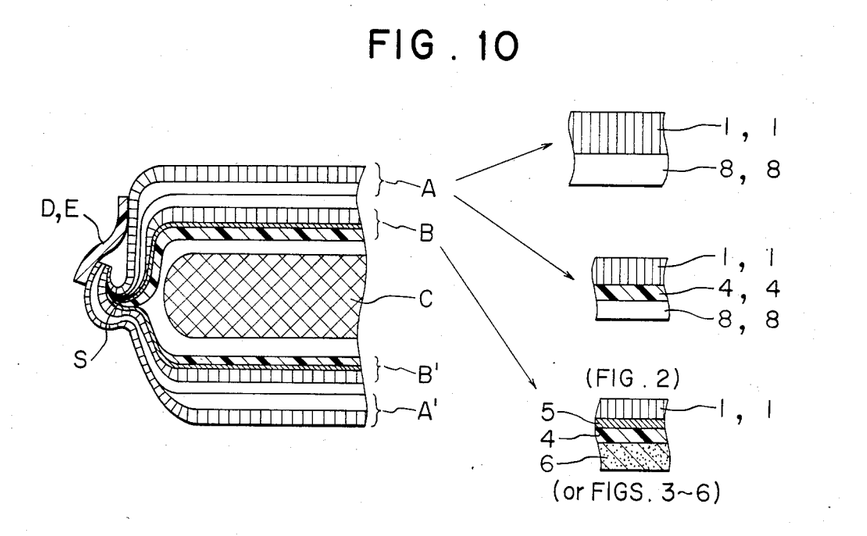
FIG. 10 is a sectional view of the double-ply gussetted bag with a photosensitive material sealed-in, in which an outer sheet is used together with an inner sheet formed of the inventive packaging material.

FIG. 10 illustrates a double-layer bag comprising a double-sheet laminate consisting of an outer sheet A or A' and an inside sheet B or B', which is frequently used to package a photosensitive material C such as, for instance, a photosensitive and heavy article or a photosensitive article with sharp edges, e.g., roll-films (cine-films, UV-setting films, printing films, microfilms, phototypographic films, etc.), roll-paper (photographic paper, diazo paper, etc.), sheet-films or paper, PS prints and such, said bag being bonded together partly or entirely at the sealed region S. When packaging a heavier or thicker photosensitive article or material, or partly effecting partial bonding at the region S, the bonded region is folded-in one or more times, and sealed together by a bonding agent D or a tape E for ensuring sealing and light-shielding. The outer sheets A and A' may of a similar of different structure, and the inside sheets B and B' formed of the inventive material may be of a similar or different structure as well.

In the metallizing film 5a used in the present invention, it is required that the flexible sheet 1 be 5 to 120 microns in thickness, and the thin metal layer 5 be 55 to 1200 angstroms in thickness.

The thickness of the flexible sheet 1 should be predetermined so as to cut down the costs for preparing it and forming the thin metal layer, and to improve heat sealability, antistatic properties, rigidity, physical strength, processability of thin metal layer, laminating processability, etc. In a thickness below 5 microns, the flexible sheet is so thin and weak that the thin metal layer can not be formed thereon nor laminated thereon with the light-shielding layer due to its tendencies toward breaking and wrinkling. A thickness exceeding 120 microns is also not suitable, since it raises some problems in connection with the costs for preparing the flexible sheet and thereon forming the thin metal layer as well as heat sealability, antistatic properties and rigidity.

The flexible sheet may be not limited to the single-layer structure, and may be of a two or more layer-structure wherein a co-extruded film, composite paper, a laminated film or the like is used.

Typical examples of the flexible sheet 1 are based on various types of paper, bonded fabrics, synthetic paper, cellophane, various films (those of polyester, acryl, vinyl chloride, styrol, polypropylene, polyethylenes, nylon and polycarbonate), or cross-laminated films wherein two uniaxially stretched (or molecule-oriented) films are laminated together with their orienting axes intersecting each other. Alternatively, use may be made of laminates comprising two or more of the aforesaid flexible sheets to this end. It is noted, however, that the present invention is not limited to the foregoing, and is applicable to every known sheet and film as well as laminates comprising two or more thereof.

Particular preference is given to uniaxially or biaxially molecule-stretched thermoplastic resin films which are tough and strong, and hard to wrinkle even with its small thickness. The most typical preparation of molecule-oriented films are well-known in the art.

The molecule-oriented films are formed of thermoplastic resins such as, for instance, polyethylenes, polypropylenes, polyester, polyamide, polycarbonate, polystyrene, polyvinylidene chloride, polyvinyl chloride, etc., or copolymers composed mainly of such polymers, or mixtures of two or more of such thermoplastic resins. Preferable are polyester, nylon, high-density polyethylene (HDPE), medium-density polyethylene (MDPE), low-pressure low-density polyethylene (L-LDPE) and polypropylene. Particular preference is given to polyester, polypropylene and high-density polyethylene having a density of 0.945 g/cm$^3$ or higher. The term "molecule-oriented film" shall embrace a film in which the rate of orientation in the molecular orientation direction is higher than that in the direction perpendicular thereto by a factor of at least 1.5. For instance, an inflated film having a blow-up ratio of 2 and a ratio of longitudinal stretching of 3 may be referred to as the longitudinally threefold-stretched film.

Generally, the uniaxially molcule-oriented films refer to (laterally or longitudinally) uniaxially stretched films (obtained by means of a tenter). In the present invention, however, the wording shall include physically shaped or inflated films (tubular films) that are molecularly oriented in an increased blow-up ratio as well as films that are strongly molecule-oriented in the longitudinal direction, and then spirally cut for oblique molecular orientation (e.g., 45°). Known examples of the production of uniaxially molecule-oriented (stretched) films are, for instance, disclosed in Japanese Patent Kokai Publication Nos. 47-34656 and 45-100464 corresponding to B.P. 1414681 and U.S. Pat. No. 3,891,374 as well as Janapese Patent Kokoku Publication Nos. 40-5319, 47-38621, 47-39927 and 53-18072.

Uniaxially molecular orientation may be effected in any one of the longitudinal, lateral and oblique directions. In special cases, however, certain types of crosslaminated films, wherein two layers forming a uniaxially stretched film are laminated upon each other with their axes intersecting at angles of 30° or more, are most suitably used as the materials for, in particular, heavy photosensitive materials. Those two layers may be formed of identical or different components with their degrees of orientation and stretching being identical or different.

Where it is intended to keep the tensile strength in every direction constant on the average, it is advantageous that the cross angles of the molecular orientation axes are maintained at 90°.

This implies that longitudinally molecular orientation may be combined with laterally molecular orientation, or two films, molecular-oriented obliquely at 45°, may be laminated on each other with their axes intersecting at right angles.

Where it is desired to enhance the tensile strength in a certain direction, the cross angles may advantageously be somewhere between 30° and 90°, rather than jst 90°. However, since the tear strength parallel with the axes of molecular orientation or the tensile strength normal thereto drops at decreased cross angles, the cross angles are 30° or more, preferably in a range of 45° to 90° for the purpose of general packaging materials.

No particular limitation is imposed upon the extent of molecular orientation and stretching, which may be selected depending upon the components and the use of the products. However, a noticeable stretching effect is achieved, where the degree of stretching is in a range of 2 to 15. In the case where a light-shielding substance is contained, it is preferred that the extent of stretching is in a range of 2 to 7 in view of the quality of films as by expressed in terms of the occurrence of fisheyes.

The thickness of the films may be selected depending upon the purpose, but may generally be in the range of 15 to 70 microns for the purpose of packaging materials.

Formation of the thin metal layer on each or both sides of the flexible sheet may rely upon any known thin film-forming means generally referred to as "deposition techniques" such as vacuum vapor deposition, physical or chemical deposition, sputtering, ion plating, electron beam deposition, etc. The thin metal layer may, for instance, be formed onto one side of the flexible sheet facing the light-shielding layer.

The thin metal layer 5 may be formed of pure metals such as Al, Sn, Zn, Co, Cr, Ni, Fe, Cu, etc., alloys thereof, or any other metals of which thin films may be made, but the most preference is given to aluminum (Al) due the cost and susceptibility to processing.

For the purpose of achieving the objects of the present invention and in order to guarantee the physical strength, light-shielding properties, antistatic properties and moistureproofness sufficient for laminates, the thin metal layer 5 should have a thickness of 55 and 1200 angstroms. In a thickness below 55 angstroms, it is impossible to suppress electrostatic charging occurring on both sides of the thin metal layer. In addition, the moistureproofness and light-shielding properties required for the packaging materials for photosensitive materials cannot be assured, unless there are increases in the thickness of the flexible sheet 1 and the light-shielding layer ⑥ applied on each side of the thin metal layer 5.

In a thickness exceeding 1200 angstroms, the antistatic and light-shielding properties as well as moistureproofness may be assured, but there arise problems in connection with the cost and quality such as deteriorations of the flexible sheet 1 due to heating in the case of vacuum vapor deposition, etc., drops of the physical strength of the resulting laminated film and the like. Referring to aluminum-deposition layers, they should be in thickness of at least 70 angstroms, preferably 80 to 800 angstroms for the general use, and more preferably 100 to 600 angstroms.

If required, an additional protective layer 7 may be applied over the thin metal layer 5.

The protective layer 7 may be made of suitable resins such as acrylic resin, cellulosic resin, e.g., acetate fiber base resin, urethane resin, epoxy resin, polyester resin, ionomer resin, EEA resin, various polyethylene resins, polypropylene resin, etc. Further, wax, gelatin, polyvinyl alcohol, etc., may be applied to this end.

Advantageously, the protective layer 7 for the thin metal layer 5 may be formed into an extremely thin thickness. Even when relying upon co-extrusion lamination, the protective layer should have a thickness of 50 microns or less for sufficient removal of static electricity.

Satisfactory protection of the thin metal layer and sufficient elimination of static electricity can effectively be achieved by forming the protective layer into a thickness of 5 microns or less by known solution- or spray-coating. For further complete removal of static electricity, antistatic agents may be incorporated into the flexible sheet 1, the light-shielding layer ⑥, the adhesive layer 4 and/or the protective layer 7.

Typical examples of the adhesives used for the adhesive layers include hot-melt adhesives based on polyolefinic thermoplastic resins such as polyethylenes, polypropylene and polybutene, hot-melt adhesives based on thermoplastic resins such as olefinic copolymers, for instance, ethylene-propylene copolymers, ethylene-vinyl acetate copolymers and ethylene-acrylate copolymers as well as ionomer resins, and other hot-melt and solvent type rubber base adhesives.

More concretely speaking, the polyolefinic adhesives include polyolefins such as polyethylenes, polypropylene, polystyrene and EPR, or copolymers thereof as well as copolymers of ethylene and other monomers such as low-pressure linear low-density polyethylene (L-LDPE), ionomer resins (ionic copolymers) such as Surlyn (Du Pont) and Admer (Mitsui Polychemical) and graft polymers.

Provision of the adhesive layer may rely upon any known method. In most cases, however, extrusion coating of thermoplastics is used from the economical standpoint, whereas dry laminating, according to which cracking of the metal thin film hardly occurs, is employed from the standpoint of quality.

Representative examples of the known solution coating manners embrace dip coating, spray coating, air knife coating, curtain coating, roller coating, doctor coating, wire bar coating, slide coating, engraved-roll coating, extrusion coating with a hopper as disclosed in U.S. Pat. No. 2,681,294 specification and such. If required, two- or multi-stage coating may be carried out simultaneously by the procedures as disclosed in U.S. Pat. Nos. 2,761,791, 2,941,898 and 3,508,947 specifications as well as S. Harazaki COATING KOGAKU (ENGINEERING), Asakura Shoten, 1973, P. 253. Out of these procedures, proper one may be selected depending upon the amount and rate of coating.

It is desired to apply known activating treatment to the respective surfaces, viz., the coating surface of the flexible sheet on which the thin metal layer is formed, the thin metal surface to which the protective layer is applied, the surface to which the adhesive layer is applied, and the like surface, prior to applying printing or laminating other layer thereto.

Surface activation may be carried out by anchor coating, etching by acid, flame treatment with a gas burner, corona- or glow discharge treatement, or the like treatment. However, the corona discharge treatment may advantageously be used, as disclosed in U.S. Pat. Nos. 2,715,075, 2,846,727, 3,549,406, and 3,590,107 specifications, due to its low cost or convenience.

The light-shielding layer is composed of a polyethylenic polymer and a light-shielding material in an amount of 0.3% by weight or more. The figure 0.3% indicates the minimum amount of the light-shielding material required to secure the light-shielding properties thereof. The polyethylenic polymer should contain a low-pressure linear low-density polyethlene (L-LDPE) in an amount of no less than 45% to achieve high seal properties and to secure strength, rigidity and slip properties upon addition of carbon, as will be described in detail later.

The remainder of the aforesaid polyethylenic polymer is hereinafter called the additives, and is preferred to be substantially a high-pressure low-density polyethylene (LDPE). However, as the additives use may be made of any thermoplastic resin capable of being kneaded with L-LDPE, such as various polyethylenes (HDPE, MDPE, LDPE), ethylene copolymers (e.g., ethylene/ethyl acrylate and ethylene/vinyl acetate copolymers), ionomer resins, polystyrene, polybutylene and polypropylene, which may be employed alone or in combination.

However, it is preferred that the polyolefinic resins are used to improve physical properties. That is, LDPE, MDPE, HDPE, PP, PEA, EVA, ionomers, polybutene-1, etc., are preferably used alone or in combination.

The wording "low-pressure linear low-density polyethylene (L-LDPE)" used herein refers to a copolymer of ethylene and an alpha-olefin having 3 to 13, preferably 4 to 10 carbon atoms, said copolymer including a short branch on its linear straight chain. In the present invention suitable are the copolymers having an ethylene content of 80 to 99.5 mole % and an alpha-olefin content of 0.5 to 10 mole %. The low-pressure linear low-density polyethylene (L-LDPE) is generally produced by the low-pressure process, and is supposed to have a low to medium density. However, the polymer used in the present invention, in most cases, has a density ranging from 0.91 to 0.95 g/cm$^3$, preferably from 0.91 to 0.94 g/cm$^3$.

The ethylene polymer used has a melt index (MI) of 0.2 to 40, preferably 0.4 to 15 at 190° C. The alpha-olefins used embrace butene-1, octene-1, hexene-1, 4-methylpenetene-1, etc. Preferred use of 4-methylpenetene-1 and hexene-1 leads to improvements in physical strength. More concretely, L-LDPE used in the present invention is commercially available under the trade names of UNIPOLE (UCC), DOWLEX (Dow Chemical), MARLEX (Philips), SUCLEAR (DuPont, Canada), ULTZEX (Mitsui Sekiyu Kagaku), and such. Preferable is inter alia L-LDPE having an ethylene content of 90 to 99.5 mole %, an alpha-olefin content of 0.5 to 10 mole %, a melt index of 4 to 15 and a density of 0.91 to 0.94 g/cm$^3$, said olefin being hexene-1 or 4-methylpentene-1, and corresponding to, e.g., ULTZEX (Mitsui Petrochemical Co., Ltd.).

The L-LDPE light-shielding layer ⑥ may be applied directly on the thin metal layer 5 of the metallizing film 5a or the protective layer 7 therefor. Alternatively, the L-LDPE light-shielding layer ⑥ is separately prepared, and may be laminated thereon through an adhesive layer. In the former case of direct lamination, the light-shielding layer has properly a thickness of 13 to 70 microns, more preferably 20 to 50 microns, and, in the latter case of later lamination, it has appropriately a thickness of 13 to 120 microns, more preferably 35 to 90 microns. As the L-LDPE light-shielding layer excels in heat-seal strength, it provides a stronger heat seal, as compared with the conventional high-pressure low-density polyethylene (LDPE), when they are applied in the same thickness. It is also advantageous to laminate on the surface of the light-shielding layer a heat-sealing layer having a melting point lower than that thereof. In view of heat-seal properties, an additional advantage is obtained by using the light-shielding layer per se as the heat-seal layer.

This tendency becomes significant especially if combined with the addition of carbon black. The L-LDPE light-shielding layer containing carbon black can provide at least a stronger heat seal, as compared with the conventional LDPE light-shielding layer, when they are applied in the same thickness.

According to another appreciable feature of the present invention, the light-shielding properties should be afforded to the heat-sealed layer so as to secure light-shielding of the packaging material for photosensitive materials (due to the fact that as the heat-sealed layer increases in thickness, light is more apt to penetrate through the section thereof). However, even if L-LDPE contains carbon black, it does not serve to decrease strength, unlike LDPE. Rather, L-LDPE serves to improve strength, where it contains 1 to 15% of carbon black. Hence, the present invention is particularly useful as the packaging material for the photosensitive materials, for which perfect light shielding is required. To achieve satisfactory light-shielding properties with a thin layer is not only advantageous in cost, but also make the suppression of rigidity possible, which results in improvements in the applicability with respect to an automatic packaging machines. Preferably, the amount of the light-shielding substance to be added to the laminate is in a range of 0.5 to 15 g/cm2. With the increase in strength in mind, the amount of carbon black to be added to the L-LDPE light-shielding layer is preferably in the range of 1 to 15%, while carbon black may be added in an amount of 15 to 20%, where it is desired to particularly improve light-shielding and antistatic properties. Together with or for carbon black, use may be made of inorganic and organic pigments, coloring agents, etc., which are known as the light-shielding material. When the L-LDPE light-shielding layer is used as the heat-seal layer, there is another advantage that increased sealing strength is obtained just after heat-sealing. With L-LDPE, the sealed surface solidifies rapidly. For that reason, stretching and thinning of the sealed portion are avoided, and so it is unlikely that light-shielding properties and strength can deteriorate, or pin holes may occur; in other words, good hot tack is obtained.

A still further advantage of the L-LDPE light-shielding layer according to the present invention is that surface strength is so high as to cause no occurrence of scratching. This is combined with the strength characteristics brought about by the addition of carbon black to prevent generation of black powders, unlike to the case of low-density polyethylene.

Still another advantage of the L-LDPE light-shielding layer lies in the slip properties thereof. When articles are inserted into bag materials, the less the coefficient of friction thereof, the easier the insertion is. Thus, it is unlikely that the articles may suffer flaws, or the bag may suffer breaks. This easy-to-insert-property is important especially where packaging is effected with an automatic packaging machine. As the articles increase in size and weight, such slip properties are required more and more. The L-LDPE layer used includes angle of slide of 7° to 15° on the surface and, in this respect, is also superior to LDPE (18° to 25°).

The packaging material of the present invention is particularly useful to package photosensitive materials, but, for that purpose, at least one of the overall layers laminated upon one another should possess light-shielding properties. It is inevitable to this end that the light-shielding substance is added to the light-shielding layer ⑥ of low-pressure linear low-density polyethylene, but, for further perfectness, it may be incorporated into one or more of the flexible sheet layer 1, the adhesive layer 4, the protective layer 7 for the thin metal layer, the heat-seal layer 8 and other layers. Alternatively, the thickness of the thin metal layer inevitable for the present invention may be adjusted between 55 angstroms and 1200 angstroms so as to improve moistureproofness. Still alternatively, additional light-shielding properties may be afforded by printing.

The suitable amount of the light-shielding substance, if present, is in a range of 0.5 to 15 g per unit area (m²) of the overall laminate. The addition of the light-shielding material to the molecule-oriented film in an amount of 12% by weight or higher is unpreferred for that the occurrence of fisheyes generally leads to drops of physical strength, etc. A preferable amount of the light-shielding material is therefore in a range of 1.5 to 7% by weight, provided however that this is not true of the flexible sheets such as paper. The light-shielding substance shall embrace any substance which does not transmit visible and ultraviolet light therethrough, and typically includes various carbon black, aluminum powders, aluminum paste, coloring pigments, coloring dyes, white pigments such as titanium oxide, barium sulfate, calcium oxide and clay, various powdery metals, various fibrous metals and such. In respect of quality, cost and light-shielding power, carbon black, aluminum powders, and aluminum paste freed of low-volatile ingredients are preferred for the purpose of packaging photosensitive materials.

Depending upon the resin used, the machine applied and the cost involved, the light-shielding material is used in the form of powdery coloring agents, pasty coloring agents, masterbatches, dyes and pigments and colored pellets.

The raw material of carbon black, one typical light-shielding material used in the present invention, is broken down into gas black, oil furnace black, anthracene black, acetylene black, soot, pine soot, vegetable black, animal black, etc. In the present invention, furnace carbon black is desired in view of the light-shielding properties, cost and improvements in physical properties. It is also desired to use acetylene carbon black and Ketschen carbon black as the light-shielding material which is costly yet produces an antistatic effect. If necessary, the former carbon black may preferably be mixed with the latter depending upon the required properties. As mentioned in the foregoing, the light-shielding materials may be incorporated into the polyethylenic polymer in various forms, however, masterbatching is desirous in view of the cost and for the purpose of preventing environmental pollution. For instance, Japanese Patent Kokoku Publication No. 40-26196 discloses a process for preparaing a polymer/carbon black masterbatch by dispersing carbon black in a solution of a polymer in an organic solvent, and Japanese Patent Kokoku Publication No. 43-10362 teaches a process for preparing a masterbatch by dispersing carbon black in polyethylene.

In particular, the present invention will now be explained with reference to the masterbatching method, to which the invention is not exclusively limited, and in which carbon black is incorporated into the polyethylenic polymer.

First of all, carbon black is mixed with LDPE (high-pressure low-density polyethylene) in a high concentration of 2% by weight or higher, generally 10% by weight or higher, to form a masterbatch. The masterbatch is weighed in such a way that the carbon black content of the final product reaches the given value, and is mixed with L-LDPE.

In this method there are two merits. One is that mixing and dispersion are more easily effected, as compared with direct mixing of carbon black with L-LDPE, leading to a cutdown in the cost and prevention of occurrence of fisheyes.

Another is that the combination system of LDPE and L-LDPE is superior to the single system of L-LDPE in the processability at film preparation. As the masterbatching resin, L-LDPE may be used to cut down the mixing cost of carbon black. In the present invention, the masterbatching resin is preferably a polyolefinic resin having a melt index higher than that of L-LDPE in view of uniform mixing. It is to be noted that this holds substantially for another light-shielding materials.

With L-LDPE, the melt tension and flowability posed certain problems in that the preparation of films therefrom did not only require larger energy than did the production of films from polyethylene, but design modification or even new installation of an inflation molding machine was also needed. In this connection, for instance, Japanese Patent Kokai Publication No. 55-117638 discloses a method for modifying the structure of a screw, which is designed to reduce the amount of load impressed thereon and heat generated by the revolution thereof.

Where 5% or higher of LDPE is contained, an existing T-die or inflation molding machine can be used without making any modification thereto, according to the masterbatching method of the present invention.

From the standpoint of processability alone, the less the amount of L-LDPE, the better the results will be. However, when the amount of LDPE is above that of L-LDPE in the present invention, carbon black produces no sufficient effect upon increases in strength. It is thus required that the amount of L-LDPE contained in the overall polyethylene polymer be 45% or higher, preferably 50% or hgiher, and more preferably 60% or higher. Improvements in processability are achieved even by mere incorporation of LDPE into L-LDPE, the addition of the light-shielding substance makes a contribution to further increases in the stability of bubbles in combination with its own favorable influence.

On the other hand, the polymer blend system excels in physical properties, and is markedly improved in respect of tear strength, heat-seal strength and Gelbo test strength in particular. The data are shown in TABLE 1. It is understood that the light-shielding layer may contain antistatic agents, lubricants, etc.

While the two essential layers of the present invention, the light-shielding layer ⑥ and the thin metal layer-incorporated metallizing film 5a, are as discussed above, other layers may be further laminated to form a composite (laminated) film, when carrying out the present invention.

Other packaging materials used for the composite films according to the present invention may include other thermoplastic films such as, for instance, those of polyethylenes, ethylene copolymeric resins, polypropylene, polyvinyl chloride, polyvinylidene chloride, polyamide, polycarbonate, fluorine resins, polyester, etc., or modified resins thereof.

Preferable are also flexible sheets such as cellulose acetate films, cellophane, polyvinyl alcohol films, paper, aluminum foils, bonded fabrics, cross laminated porous fabrics, foamed sheets of polyethylene, polyurethane and polystyrene, and the like. The foregoing other packaging materials may be used alone or in combination.

Preparation of composite films by the lamination of the foregoing other packaging materials and the polyethylenic films according to the present invention may rely upon the conventional methods involving, for example, the heat-bonding methods (hot plate-bonding, impulse bonding and ultrasonic bonding), the methods using bonding materials or adhesives (wet-laminating, dry-laminating, hot-melt laminating, extrusion laminating) and coextrusion laminating methods.

The composite (laminated) films thus obtained are considered to be improved in respect of heat sealability, strength, slip properties, antistatic properties, printability, light-shielding properties, appearance, etc.

The packaging materials according to the present invention are best-suited for the packaging of photosensitive materials. The term "photosensitive materials" used herein shall embrace photosensitive materials such as silver halide photosensitive photographic materials, diazo photosensitive photographic materials, photosensitive resins, self-developing type photosensitive materials and diffusion transfer type photosensitive photographic materials and, in addition to such materials, any substance that suffers discoloration, hardening, or the like change or deteriortation upon exposure to light.

Concretely mentioned are foodstuffs such as chocolate, margarine, miso (fermented pasty products of soybeans or the like), wine and beer, medicines, dyestuffs, and other chemicals such as developers and mordants for dyestuffs.

The packaging materials according to the present invention may be applied to the foregoing photosenstive substances in the form of a single-sheet flat bag, a double-sheet flat bag, a bag with a rectangular bottom, a self-supporting bag, a single-sheet gussetted bag, a two-sheet gussetted bag, a film sheet, an initial lining for moistureproof boxes, and leader paper, and in other every known form.

Figure 11:
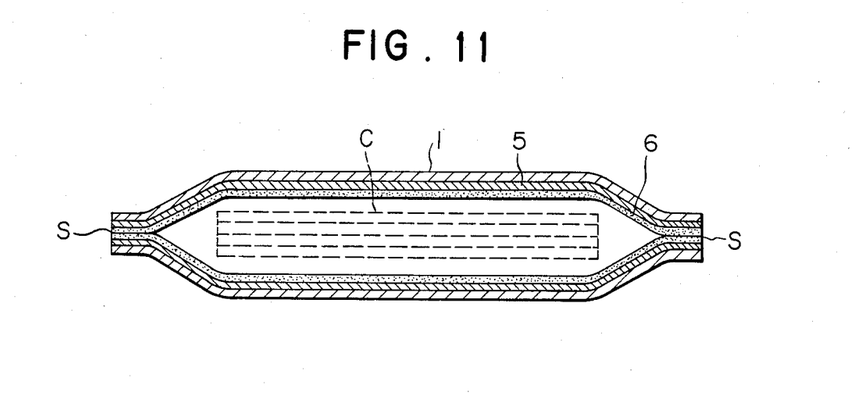
FIG. 11 is a sectional view of a completely sealed and packaged photosensitive material.

In accordance with the present invention, the article (a photosensitive material) may be rolled up by the present product comprising the outer flexible sheet 1 and the inner light-shielding layer ⑥. Alternatively, a photosensitive material C is advantageously packaged or wrapped in various bags for complete light-shielding. Depending upon the nature of the laminated films used, bag-making may rely upon the known plastic film-sealing techniques such as heat sealing, impulse sealing, ultrasonic sealing and high-frequency sealing. Bag-making may be effected with suitable adhesives, tackifiers, etc. In FIGS. 9, 10 or 11, a capital S stands for the sealed portion. As illustrated in FIG. 9, the bag may be sealed entirely therearound. Alternatively, the bag may be sealed discretely or partly therearound.

Figure 12:
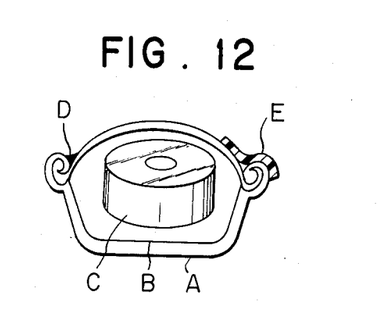
FIG. 12 is a schematically sectional view of a monochrome or color roll-photosensitive material (photographic paper, cinefilms, printing films, indirect X-ray films, microfilms, etc.) in the packaged form.

The bag may be of every known or other form or structure. For example, single-layer flat bags are illustrated in FIGS. 9 and 11, while double-layer gussetted bags comprising inner and outer sheets are shown in FIGS. 10 and 12.

Over the prior art packaging materials R1, R2 and R3 as well as the control packaging materials C1 and C2 each including an L-LDPE light-shielding layer, the packaging materials according to the present invention are improved in respect to the cost, tear strength, resistance to impact perforation (in terms of extent of impact perforation), Gelbo test strength, light-shielding properties and drop strength, and are thus useful as the general-purpose packaging materials, inter alia, for the packaging of the photosensitive material.

In what follows, the present invention will be explained with reference to typical examples of the preferred embodiments of the packaging materials according to the present invention.

EXAMPLES

The prior art samples R1, R2 and R3 correspond to FIG. 1. In R1, bleached kraft paper of 30 g/m$^2$ was used as the flexible sheet, a high-pressure low-density polyethylene (LDPE) having a carbon black content of 3.0% by weight and a thickness of 70 microns was employed as the LDPE light-shielding layer, and LDPE having a thickness of 15 microns was applied as the adhesive layer 4 on which the aluminum foil 2 of 7 microns in thickness was laminated. Sample R2 was similar to R1, except that the LDPE light-shielding layer contained 6% by weight of carbon black. In R3 corresponding to FIG. 7 (PRIOR ART), a 7 micron-thick aluminum foil of and 40 micron-thick, bleached kraft paper 1 of 30 g/m$^2$ were laminated between 3% by weight carbon black-containing LDPE light-shielding films (3,3) each having a thickness of 40 microns.

Control packaging materials of the layer structure corresponding to FIG. 1 were prepared, wherein the low-pressure linear low-density polyethylene (L-LDPE) films having a carbon black content of 3.0% (C1) and 6.0% by weight (C2) were used as the L-LDPE light-shielding layer (corresponding to 6 in FIG. 2) in place of the LDPE light-shielding film 3, and the rest was similar to R1 and R2.

TABLE 1 shows the results of comparison of the packaging materials according to the present invention with R1-3 and C1-2.

TABLE 1

Composition, Layer Structure & Properties of Packaging Materials

| | | | Prior Art (Light-shielding LDPE Layer) | | | Comparative Samples (Light-shielding L-LDPE Layer) | | Light-shielding Layers of L-LDPE alone for Comparison | | Present Invention (with L-LDPE Light-shielding Layer) | | |
|---|---|---|---|---|---|---|---|---|---|---|---|---|
| | Reference Numerals | | R1 | R2 | R3 | C1 | C2 | S1 | S2 | 1 | 2 | 3 |
| Details of Packaging Materials | Amount of L-LDPE | wt % | 0 | 0 | 0 | 89.5 | 79.0 | 94 | 79.0 | 89.5 | 79.0 | 79.0 |
| | Amount of LDPE | wt % | 100 | 100 | 100 | 7.5 | 15.0 | 0 | 15.0 | 7.5 | 15.0 | 15.0 |
| | Amount of Carbon Black | wt % | 3.0 | 6.0 | 3.1 | 3.0 | 6.0 | 6.0 | 6.0 | 3.0 | 6.0 | 6.0 |
| 3 or 6 | Thickness of Light-shielding Layer | μm | 70 | 70 | 40 × 2 | 50 | 50 | 50 | 50 | 50 | 50 | 50 |
| 1 | Type of Flexible Sheet | | 30 g/m² Bleached Kraft Paper | 30 g/m² Bleached Kraft Paper | 30 g/m² Bleached Kraft Paper | 30 g/m² Bleached Kraft Paper | 30 g/m² Bleached Kraft Paper | — | — | 30 g/m² Bleached Kraft Paper | 30 g/m² Bleached Kraft Paper | Biaxially Stretched Polyester Film |
| | Thickness of Flexible Sheet | μm | 40 | 40 | 40 | 40 | 40 | — | — | 40 | 40 | 12 |
| 5 | Thickness of Thin Metal Layer | Å | — | — | — | — | — | — | — | Al 500 | Al 500 | Al 500 |
| 2 | Thickness of Aluminum Foil | μm | 7 | 7 | 7 | 7 | 7 | — | — | — | — | — |
| 4 | Type of Adhesive Layer | | Extrusion Laminated LDPE | — | — | as left | as left | — | — | Extrusion Laminated LDPE | as left | as left |
| | Thickness of Adhesive Layer | μm | 15 × 2 | 15 × 2 | 15 × 3 | 15 × 2 | 15 × 2 | — | — | 15 | 15 | 15 |
| 7 | Thickness of Protective Layer | μm | — | — | — | — | — | — | — | — | — | — |
| 8 | Thickness of Heat-seal Layer | μm | — | — | — | — | — | — | 50 | — | — | — |
| | Layer Structure | | FIG. 1 | FIG. 1 | FIG. 7 | FIG. 1 | FIG. 1 | — | — | FIG. 2 | FIG. 2 | FIG. 2 |
| | Total Thickness of Composite Laminate | μm | 150 | 150 | 180 | 130 | 130 | 50 | 50 | 115 | 115 | 90 |
| Properties | Longitudinal Tear Strength | g | 157 | 78 | 294 | 317 | 382 | 794 | 910 | 872 | 1012 | 943 |
| | Lateral Tear Strength | g | 212 | 102 | 610 | 326 | 366 | 951 | 1004 | 983 | 1210 | 1020 |
| | Impact Perforation Strength | kg·cm | 3.8 | 2.1 | 5.1 | 7.6 | 8.3 | 6.8 | 8.7 | 10.8 | 12.3 | 10.3 |
| | Gelbo Test Strength | | C | C | C | C~B | C~B | B | B | A | A | B |
| | Light-shielding Ability | | B | B | A | B | B | C | C | B | B | B |
| | Hot-Tack Properties (Heat-seal Ability) (160° C.) | | D | D | D | A | A | B | B | A | A | A |
| | Moistureproofness | | B | B | B | B | B | x | x | B | B | A |

Reference: Present Invention (with L-LDPE Light-shielding Layer)

TABLE 1-continued

Composition, Layer Structure & Properties of Packaging Materials

Figure 3:
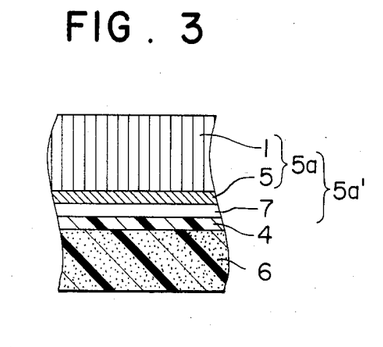
Figure 4:
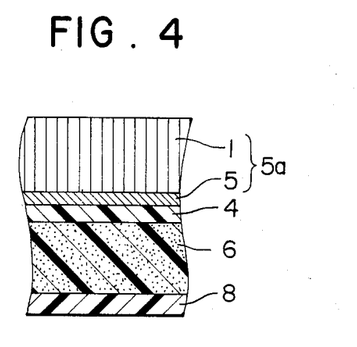

| | Numerals | | 4 | 5 | 6 | 7 | 8 | 9 | 10 | 11 |
|---|---|---|---|---|---|---|---|---|---|---|
| Details of Packaging Materials | Amount of L-LDPE | wt % | 79.0 | 79.0 | 65.0 | 94.0 | 80.5 | 80.5 | 80.5 | 94.0 |
| | Amount of LDPE | wt % | 15.0 | 15.0 | 25.0 | 0 | 15.0 | 15.0 | 15.0 | 0 |
| | Amount of Carbon Black | wt % | 6.0 | 6.0 | 10.0 | 6.0 | 4.5 | 4.5 | 4.5 | 6.0 |
| 3 or 6 | Thickness of Light-shielding Layer | μm | 50 | 50 | 50 | 50 | 50 | 50 | 50 | 35 |
| 1 | Type of Flexible Sheet | | Biaxially Stretched Polypropylene Film | Reinforced HDPE Film | Longitudinally Stretched HDPE Film | L-LDPE Film | Biaxially Stretched Polyester Film | Biaxially Stretched Polyester Film | Biaxially Stretched Polyester Film | Biaxially Stretched Nylon Film |
| | Thickness of Flexible Sheet | μm | 25 | 10 | 25 | 30 | 12 | 12 | 12 | 20 |
| 5 | Thickness of Thin Metal Layer | Å | Al 500 | Al 500 | Al 500 | Al 500 | Al 400 | Al 300 | Al 400 × 2 | Al 400 |
| 2 | Thickness of Aluminum Foil | μm | — | — | — | — | — | — | — | — |
| 4 | Type of Adhesive Layer | | Extrusion Laminated LDPE | as left | Dry-laminated Polyurethane Bond | as left | Extrusion Laminated LDPE | as left | as left | Dry-laminated Polyurethane Bond |
| | Thickness of Adhesive Layer | μm | 15 | 15 | 2 | 2 | 15 | 15 | 15 | 2 |
| 7 | Thickness of Protective Layer | μm | — | — | — | — | Acrylic Resin 0.6 | — | — | — |
| 8 | Thickness of Heat-seal Layer | μm | — | — | — | — | — | ionomer 20 | Extrusion Laminated LDPE 15 | LDPE 35 |
| | Layer Structure | | FIG. 2 | FIG. 2 | FIG. 2 | FIG. 2 | FIG. 3 | FIG. 4 | FIG. 5 | FIG. 6 |
| | Total Thickness of Composite Laminate | μm | 101 | 89 | 81 | 85 | 81 | 103 | 97 | 95 |
| Properties | Longitudinal Tear Strength | g | 1040 | 1120 | 926 | 1080 | 987 | 1235 | 1130 | 1220 |
| | Lateral Tear Strength | g | 1260 | 1330 | 983 | 1290 | 1120 | 1380 | 1210 | 1280 |
| | Impact Perforation Strength | kg · cm | 12.6 | 13.8 | 9.8 | 13.1 | 11.2 | 14.1 | 11.5 | 13.2 |
| | Gelbo Test Strength | | B | A | B | A | B | A | B | A |
| | Light-shielding Ability | | B | B | B | B | B | B | A | A |
| | Hot-Tack Properties (Heat-seal Ability) (160° C.) | | A | A | A | A | A | A | A | A |
| | Moistureproofness | | A | A | A | B | A | B | A | B |

TABLE 1 also shows the properties of the inventive packaging materials 1 to 11 of the composition and layer structure as specified therein, which contain the L-LDPE light-shielding layers. While the foregoings are related to typical embodiments preferable as the packaging materials for photosensitive materials, it should be understood that the present invention is not limited to the foregoings, and may be combined with other additional layers of other or known materials.

STARTING MATERIALS OF THE PACKAGING MATERIALS AS SPECIFIED

1. L-LDPE . . . Ultzex 2020L manufactured by Mitsui Petrochemical
   MI: 2.5, and Density: 0.923 g/cm$^3$
2. LDPE . . . DFD-0111 manufactured by Nippon Unicar
   MI: 2.4, and Density: 0.923 g/cm$^3$
3. Carbon Black . . . Furnace Black manufactured by Mitsubishi Kasei
   Average Particle Size: 21 microns In Table 1, various estimation marks generally have the following meanings (see special estimation for Gelbo Test).
   A . . . very excellent
   B . . . excellent
   C . . . practical
   D . . . problematic
   X . . . unpractical The testing procedures are as follows.
   Thickness . . . According to JIS-8118
   Tear Strength . . . According to JIS-P8116
   Impact Perforation Strength . . . According to JIS-P8134
   Gelbo Test Strength . . . Measured with the testing machine according to U.S. Military Standard MIL-B131. Estimation was made in terms of the number of bending cycles until the sample lost its light-shielding properties due to the occurrence of pin holes. The larger the number, the larger the strength.
   Estimation marks for Gelbo Test:
      Occurence of pin holes
      A: 101 times or more
      B: 51–100 times
      C: 7–50 times
      D: 3–7 times
      X: 2 times or less
   Light-Shielding Properties . . . Photographic films of ASA 100 were placed in bags formed of the respective packaging materials for complete sealing, and were exposed to light of 80,000 luces for one hour to determine and estimate the light-shielding properties theheof in terms of the degree of fogging.
   Hot Tack Properties (Hot-Seal Ability) . . . Determined in terms of a hot-peeling length (cm) when pulled each of a 45 g-load were given at a peeling angle of 22.5° to both open ends of a bag formed of two packaging materials (width: 15 mm) just after heat sealing had been effected at 160° C.
   Moistureproofness (Moisture Permeability) According to JIS-Z0208-1976 (Cup method)

It should be understood that any modification apparent in the art may be made without departing from the gist of the present invention as herein disclosed and hereinbelow claimed.

What is claimed is:

1. A packaging material for photosensitive materials comprising an at least double-layer laminated film formed by laminating a light-shielding layer and a metallizing film wherein:
   (a) said metallizing film comprising a flexible sheet having a thickness of 5 to 120 microns and a thin metal layer having a thickness of 55 to 1200 angstroms,
   (b) said light-shielding layer comprises a polyethylenic polymer and 0.3% by weight or more of a light-shielding material, said polyethylenic polymer containing 45% by weight or more of a low-pressure linear low-density polyethylene (L-LDPE), and
   (c) said laminated film has a moisture permeability of 15 g/m$^2$/24 hours or less (at 40° C. and 90% RH).

2. The packaging material as defined in claim 1, wherein said laminated film is formed into a bag by bag-making.

3. The packaging material as defined in claim 1, wherein said light-shielding layer is formed inside said flexible sheet layer.

4. The packaging material as defined in claim 1, wherein said metallizing film including a thin metal layer formed thereon is an aluminum flexible sheet layer with a flexible sheet thickness of 8 to 35 microns and an aluminum layer thickness of 80 to 800 angstroms, and said light-shielding layer is formed of a thermoplastic resin layer of 13 to 120 microns in thickness containing 50 to 99% by weight of L-LDPE and 1 to 10% by weight of carbon black, the light-shielding layer being formed inside, i.e., on the side facing a photosensitive material of said flexible sheet layer.

5. The packaging material as defined in claim 1, wherein said light-shielding layer contains carbon black in an amount of 0.3 to 30% by weight as said light-shielding material.

6. The packaging material as defined in claim 1, wherein said light-shielding layer is laminated directly or indirectly onto said flexible sheet layer without or through an adhesive layer.

7. The packaging material as defined in claim 6, wherein said adhesive layer is provided by dry-laminating.

8. The packaging material as defined in claim 6, wherein said adhesive layer is at least one thermoplastic resin selected from the group consisting of LDPE, L-LDPE, an ethylene/vinyl acetate copolymer, ionomer, an ethylene/ethyl acrylate copolymer, and an ethylene/methyl acrylate copolymer.

9. The packaging material as defined in claim 1, wherein said light-shielding layer forms a heat-seal layer.

10. The packaging material as defined in claim 1, wherein said light-shielding layer is further laminated on its surface with a heat-seal layer having a melting point lower than that of said light-shielding layer.

11. The packaging material as defined in claim 9 or 10, wherein said flexible sheet is formed of one selected from the group consisting of a thermoplastic resin film, bonded fabric and synthetic paper, said thermoplastic resin film having a melting point higher than that of the heat-seal layer by at least 5° C. and being heatsealable with an outer laminate to be disposed on the outside of the packaging material concerned.

12. The packaging material as defined in claim 9 or 10, wherein said light-shielding layer is a layer containing at least 50% by weight of L-LDPE and 1% by weight or more of a light-shielding material and having a thickness of 15 to 120 microns, said light-shielding layer being either through or without an adhesive layer laminated directly with a flexible sheet having a heat resistance higher than the heat-seal layer by at least 5° C., the flexible sheet being provided with a thin metal layer having a thickness of 70–800 angstroms.

13. The packaging material as defined in claim 12, wherein said flexible sheet is paper, bonded fabric or an oriented or stretched thermoplastic resin film.

14. The packaging material as defined in claim 1, wherein said light-shielding layer contains at least 45 to 99.7% by weight of L-LDPE as said polyethylenic polymer and 0 to 54.7% by weight of other various thermoplastic resins as other additives.

15. The packaging material as defined in claim 4, in which said other various thermoplastic resins include at least one of polyethylenes of HDPE, MDPE and LDPE, ethylene copolymers (ethylene/ethyl acrylate, ethylene/methyl acrylate and ethylene/vinyl acetate copolymers), ionomer resins, polystyrene, polybutylene and polypropylene.

16. The packaging material as defined in claim 1, wherein said flexible sheet comprises a uniaxially or biaxially molecular-oriented thermoplastic resin film.

17. The packaging material as defined in claim 16, wherein said flexible sheet is a cross-laminated film of two uniaxially molecular-oriented film layers with their axes of molecular orientation intersecting at angles of 30° or more.

* * * * *